Patented Nov. 7, 1933

1,933,732

UNITED STATES PATENT OFFICE 1,933,732

ICE CREAM FOR DIABETICS

Robert H. Haskins and Robert H. Haskins, Jr., Providence, R. I.

No Drawing. Application October 29, 1932
Serial No. 640,334

14 Claims. (Cl. 99—16)

This invention relates to a food usually known as ice cream; and has for its object to provide a food which will contain little or no sugar such as becomes inverted sugar in the body and is thus particularly desirable for use by diabetics.

Another object of the invention is the provision of an ice cream which will contain little or none of the usual sugar and yet which will not become hard and crystallized by the usual temperatures to which ice cream is subjected and which is usual in an ice cream from which sugar has been practically eliminated and thus produce a sugarless ice cream which will freeze and melt at substantially the same temperatures as ice cream which has sugar.

A further object of the invention is the provision of an ice cream which will be smooth and palatable and have a taste similar to ice cream having sugar and yet be without such sugar.

With these and other objects in view, the invention consists of certain novel ingredients, as will be more fully described, and particularly pointed out in the appended claims.

It is well known that diabetic people must control the food which they eat so as to maintain the usual sugar in a very small quantity and to meet this condition considerable trade has developed in foods which are prepared to practically eliminate sugar. One of such foods is ice cream which is prepared with the omission of sugar which causes the mixture to freeze at a much higher temperature and so materially changes the character of the preparation, that it is not particularly desirable to people who are accustomed to the sweetened ice cream usually available. This change consists primarily in the ice cream having a very crystalline effect when subjected to the usual freezing temperatures and a lack of body and palatableness; and in order that these undesirable characteristics may be avoided, we have inserted in place of the sugar certain substances, the principal one of which is glycerine which has the effect of supplying body to the preparation and also controls the freezing point in a manner similar to that of sugar and and at the same time affords to some extent a sweetened taste and is of such a character that it does not form an inverted sugar in the body and thus may be taken without harm by a diabetic; and the following is a more detailed description of the present embodiment of this invention illustrating the preferred means by which these advantageous results may be accomplished:—

In the commercial production of ice cream on a small scale, it is usual by many to buy in the open market what is known as an "ice cream mix" to which flavoring and other ingredients are added prior to whipping and freezing. The mix consists of desired dairy product sometimes containing a preparation of heavy cream, milk, condensed skim milk, gelatin and eggs homogenized at a desired pressure. Sometimes this mix may consist only of cream which is homogenized to break up the fat globules. This mixture may be purchased either sweetened or unsweetened. The mix which we use in our preparation is unsweetened and to this we add the ingredients which go to make up our new ice cream.

A satisfactory product is obtained from the following quantities:—40 quarts of homogenized unsweetened ice cream mix, 80 ounces of glycerine; 4 ounces of acacia; one half ounce salt; 32 eggs and 36 grains of saccharine. These quantities and ingredients may be varied as will be more fully explained. We first mix the acacia with the glycerine until an emulsion is formed and then add the salt, eggs and saccharine, stirring the same in order that the different ingredients may be thoroughly mixed and then add these mixed up ingredients to a batch of ice cream mix which may vary widely as above indicated, whip and freeze the same in the usual manner of forming ice cream.

The glycerine is the most important ingredient added and it supplies a body and smoothness also palatableness to the ice cream and is sweet to the taste. The glycerine is not inverted in the body as is sugar and thus is not harmful to diabetics. It is present in a more predominating quantity than the other ingredients which we have added to the ice cream mix of either cream or other dairy products as well and altho the above quantity of 80 ounces of glycerine is desirable, we have found that satisfactory results have been obtained with as low as 48 ounces of glycerine and as high as 104 ounces of glycerine, which will be dependent upon the amount of butter fat present in the ice cream, thus if the percentage of fat is high, the freezing point will be lowered and the glycerine present will be correspondingly diminished even below the figures mentioned. The change in the amount of glycerine added will vary the freezing point of the ice cream and thus the amount will be somewhat dependent upon the temperature at which the ice cream will be served. However, too great a quantity cannot be added as the oiliness which is characteristic of glycerine will become undesirable.

The acacia which is added is of a gummy nature and is not necessary. It is, however, desirable as a filler to give body and softness to the mixture and has the effect of assisting the ice cream to swell as it is whipped and thus add to the desirable properties thereof. As this substance is not necessary to a satisfactory result, it may be varied throughout a large range or entirely eliminated. We may substitute for the acacia substances such as althea, cornstarch, tragacanth or gelatine. The first two of these should not, however, be used where the ice cream is intended for diabetics alone. The tragacenth is a gum similar to acacia, while the gelatine is neither a gum or a starch and will serve to give body to the mix in the same manner as will the acacia.

The eggs which are added supply fat and protein value to the ice cream and make the same much richer and increase its bulk and food value. These may be varied in a proportion depending upon the amount of food value or richness which it is desired that the mixture possess.

Saccharine is added as a sweetener and is in an exceptionally small quantity. It has no physical effect on the preparation and its addition will be governed by personal taste. The salt is added to bring out the flavor and is in a quantity sufficiently small so as not to materially affect freezing of the mixture and may be varied thru a liberal range depending upon the personal taste desired. It will be understood that any desired flavor may be used for the ice cream, while it may be also desirable to add a little vanilla which will accentuate any such flavor which might be given to the mixture.

By the use of the ingredients above mentioned, we provide a mixture which will freeze at substantially the same temperature as the usual ice cream and yet provide a mixture of ice cream which has little or no sugar value in it and thus may be readily eaten by diabetics without harm. Further, it is extremely palatable and tasty to any person, even a non-diabetic, and is desirable to those who wish to maintain a low quantity of sweet in order to control the fat formed by the body. The control of the freezing temperature is supplied by glycerine and if this alone were used, the mixture would be better than the usual ice cream mix from which the sugar is eliminated, but as this alone would give a rather fresh taste to the mixture we add the other ingredients of salt, eggs, saccharine and acacia to make it palatable to the diabetic as well as the non-diabetic person.

The glycerine which is used also has the important characteristic of being sweet, which furnishes a desirable sweetness to the product without adding sugar which is to be minimized by diabetics and without adding much saccharine which is also to be minimized as much as possible.

By the term "ice cream mix" we intend to include heavy cream alone or any combination of dairy products, such as are present in the commercial ice cream mixes on the market. The mix being merely the base to which the other ingredients may be added.

We claim:

1. A new food preparation comprising unsweetened ice cream mix with an abnormally low amount of sugar, and glycerine present in a quantity to control the freezing point of the preparation.

2. A new food preparation comprising an unsweetened ice cream mix with an abnormally low amount of sugar, and glycerine.

3. A new food preparation comprising an unsweetened ice cream mix with an abnormally low amount of sugar, and glycerine, said glycerine being present in a quantity to control the freezing of the preparation in substantially the same degree as does the usual sugar sweetening.

4. A new food preparation comprising an unsweetened ice cream mix with an abnormally low amount of sugar, glycerine and eggs for richness and food value, said glycerine being present in substantial amounts to control freezing.

5. A new food preparation comprising an unsweetened ice cream mix with an abnormally low amount of sugar, glycerine and salt, said glycerine being present in substantial amounts to control freezing.

6. A new food preparation comprising an unsweetened ice cream mix with an abnormally low amount of sugar, glycerine and acacia, said glycerine being present in substantial amounts to control freezing.

7. A new food preparation comprising an unsweetened ice cream mix with an abnormally low amount of sugar, glycerine, eggs for richness and food value, and salt in relatively small amounts, said glycerine being present in substantial amounts to control freezing.

8. A new food preparation comprising an unsweetened ice cream mix with an abnormally low amount of sugar, glycerine, eggs for richness and food value, and acacia, said glycerine being present in substantial amounts to control freezing.

9. A new food preparation comprising an unsweetened ice cream mix with an abnormally low amount of sugar, glycerine, salt and acacia in relatively small amounts, said glycerine being present in substantial amounts to control freezing.

10. A new food preparation comprising an unsweetened ice cream mix with an abnormally low amount of sugar, glycerine, eggs for richness and food value, salt and acacia in relatively small amounts, said glycerine being present in substantial amounts to control freezing.

11. A new food preparation comprising an unsweetened ice cream mix with an abnormally low amount of sugar, glycerine, eggs for richness and food value, salt and acacia in relatively small amounts, said glycerine being present in substantial amounts to control freezing, and a flavoring in relatively small amounts.

12. A new food preparation comprising unsweetened ice cream mix with an abnormally low amount of sugar and glycerine in substantial amount.

13. A new food preparation compounded in substantially the following proportions: 40 quarts of homogenized unsweetened ice cream mix, 80 ounces of glycerine, 4 ounces of acacia, one half ounce salt, 32 eggs and 36 grains of saccharine.

14. A new food preparation as set forth in claim 13, wherein the proportion of glycerine varies from 48 to 104 ounces of glycerine.

ROBERT H. HASKINS.
ROBERT H. HASKINS, Jr.